Figure 1:
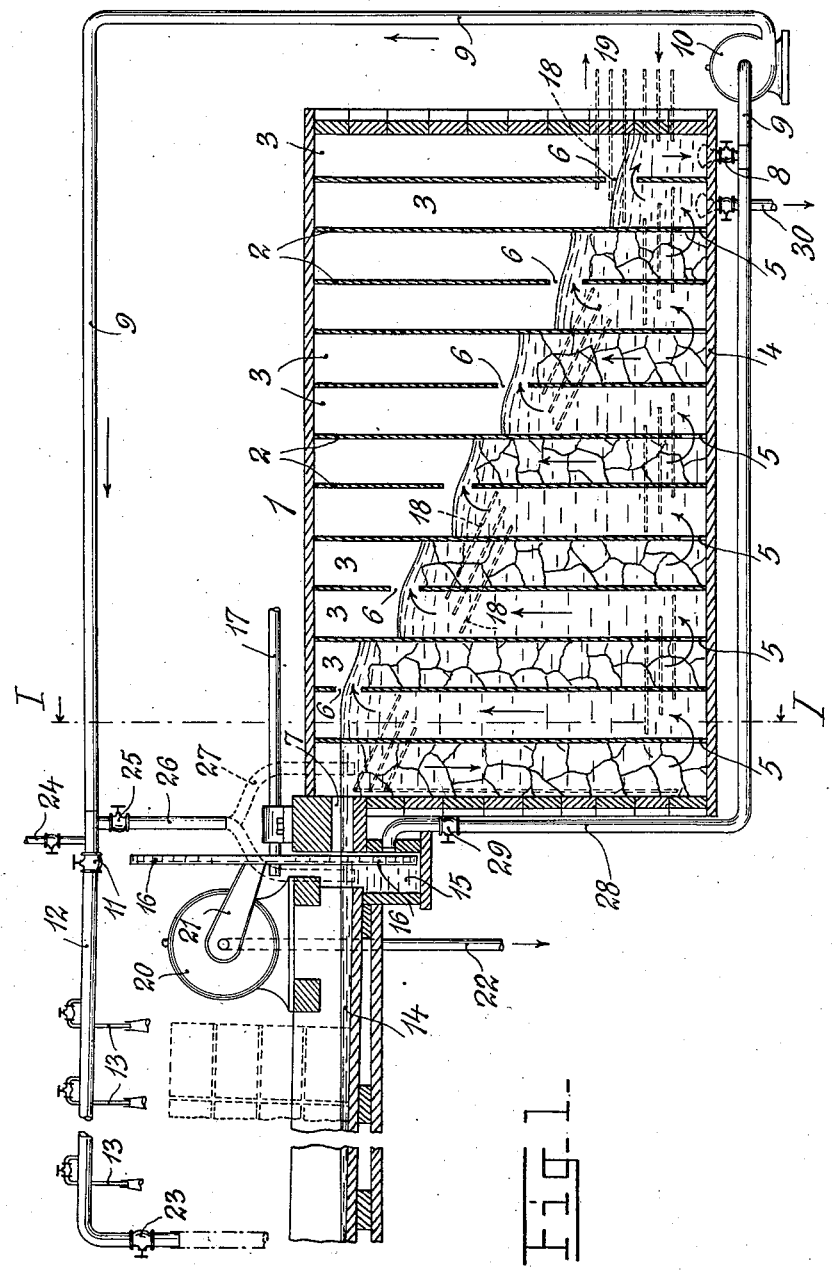

N. DAHL.
APPARATUS FOR COOLING AND FREEZING FISH AND OTHER FOOD SUBSTANCES.
APPLICATION FILED MAR. 14, 1914.

1,177,308.

Patented Mar. 28, 1916.
3 SHEETS—SHEET 1.

Witnesses:
John C. Sanders
Chauncey P. Carter

Inventor:
Nikolai Dahl
By Wallace White
Attorney

N. DAHL.
APPARATUS FOR COOLING AND FREEZING FISH AND OTHER FOOD SUBSTANCES.
APPLICATION FILED MAR. 14, 1914.
1,177,308.
Patented Mar. 28, 1916.
3 SHEETS—SHEET 2.
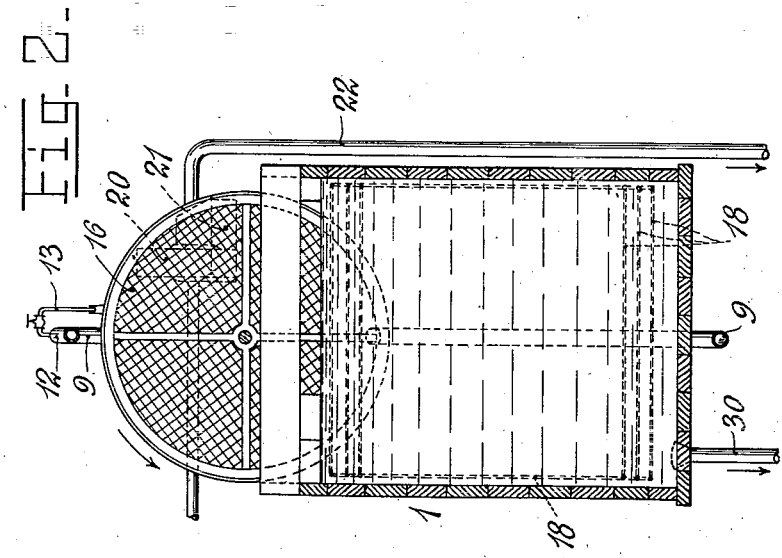

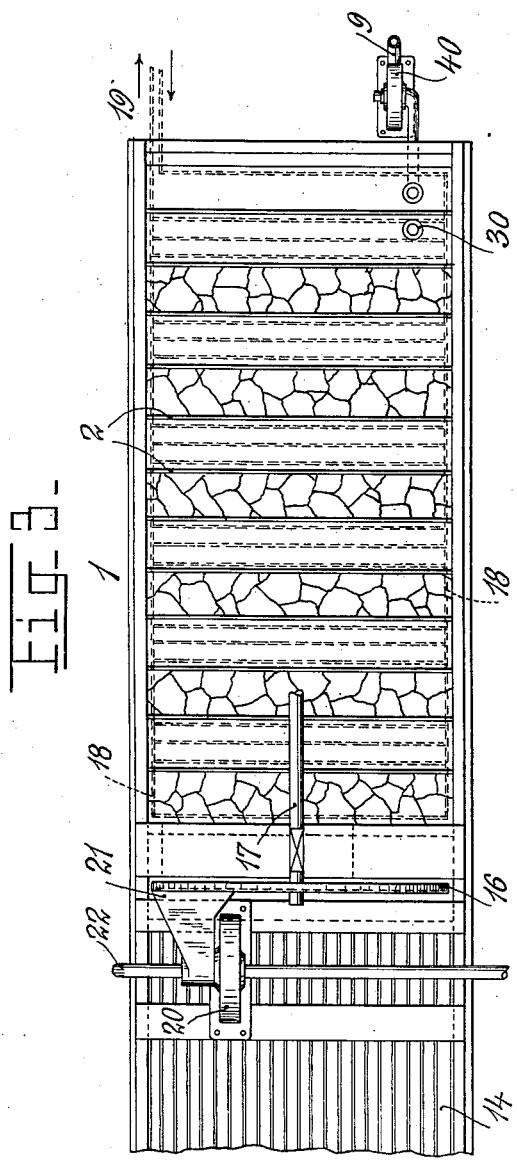

UNITED STATES PATENT OFFICE.

NEKOLAI DAHL, OF TRONDHJEM, NORWAY.

APPARATUS FOR COOLING AND FREEZING FISH AND OTHER FOOD SUBSTANCES.

1,177,308.   Specification of Letters Patent.   Patented Mar. 28, 1916.

Application filed March 14, 1914. Serial No. 824,647.

*To all whom it may concern:*

Be it known that I, NEKOLAI DAHL, subject of Norway, residing at Fjordgaten 49, Trondhjem, Norway, have invented new and useful Improvements in Apparatus for Cooling and Freezing Fish and other Food Substances, of which the following is a specification.

Arrangements for cooling and freezing fish and other articles of food by means of a circulating cooling mixture, are well known. The said mixture has a temperature below 0 degrees centigrade and is made to trickle down between or among the goods in order to completely and thoroughly freeze them. When such a circulating cooling mixture shall again be employed, a number of difficulties arise *inter alia* on cooling and cleansing the mixture.

The actual cooling will be effected most quickly and advantageously in special apparatus or containers, and in one form of appliance hitherto known for cooling purposes the liquid to be cooled has been passed through a container, within which it was able to move repeated times up and down along one side of transmission walls, the opposite side of which was in contact with the cooling medium, the latter and the liquid being thus completely separately from each other. But the passage of the liquid up and down was caused only by the difference in specific gravity of the several parts of the liquid on account of the difference in temperature. The alternating passage of the liquid therefor was not safe, and it very well could happen, that many parts of the liquid could stream directly through the container without making any movement up and down especially if the velocity of the liquid was a comparatively high one.

According to the present invention the cooling container is furnished with partitions in such a manner that the liquid to be cooled is obliged to pass in an alternating continuous stream through compartments formed between the partition walls in contact with cooling pipes or with a freezing medium (for example a mixture of ice and salt) placed within the said compartments. Hereby it is possible to cause the liquid during its course through the cooling container to rapidly acquire a low temperature.

In combination with a cooling device as mentioned above, the present invention has also for its object to provide an irrigation apparatus consisting of one or several horizontal pipes placed over the goods and from the upper side of which irrigation pipes pass downward with a siphon-like bend, the object of this arrangement being to obviate the formation of scum in the cooled liquid and also to prevent possible impurities from passing over the goods to be cooled or frozen.

A construction according to the invention is illustrated in the accompanying drawings, in which:—

Figure 1 represents a vertical section of the whole plant. Fig. 2 is a vertical cross-section on the plane I—I in Fig. 1. Fig. 3 shows a plan view of the plant.

—1— is a container that is divided into a number of parallel compartments or chambers —3— by the vertical dividing walls —2—. Every second partition wall projects a short distance beyond the bottom —4— and there forms an opening —5—, while the other walls are perforated higher up at —6— in such a manner that the perforation at the entrance end of the container (to the left) is situated highest and the next ones on successively lower levels, so that the perforation at the extreme right lies lowest.

On the left the pocket has an inlet —7— at a somewhat greater height than the uppermost perforation —6—, and to the right a pipe —8— passes through the bottom to the outlet pipe —9— which passes through a pump —10—and stop-cock —11— to a horizontal adjustable pipe —12—, where the irrigation pipes —13— are placed.

The pipe —12— is situated above the goods (*e. g.* fish boxes as indicated in the drawing). After having circulated through these, the water is collected on a sort of pan —14— and is thence conducted to a collecting and cleansing container —15—, the outlet 7 of which is obstructed by a downwardly projecting part of a circular sieve 16 driven by a shaft 17. Before the water collected in the container 15 can reach the outlet 7 and from thence to the cooling container 1, it must pass through the said part of the sieve.

As will be seen in Fig. 1 the liquid in the container —1— is given an upward and downward movement through the chamber —3—, partly by the aid of its own weight, and partly by the aid of the pump —10—. During this long journey it is exposed to the cooling, either by several of the chambers —3— being filled with ice and salt as indicated in the drawings, or by means of cooling pipes —18— placed in certain of these chambers, or by both of these methods. The pipes —18— are connected at —19— with cooling machines, that may be of any suitable construction. In this way the liquid, during its progress from the intake —7— to the outlet —8—, is very rapidly colled down to a low temperature.

Instead of a single cooling container, several may be employed, the same serving as sections.

With the object of further regulating the temperature of the cooling mixture, the liquid or a part thereof may be made several times to stream through the cooling container before being utilized for the cooling of goods.

Instead of conducting the cooling liquid from the generator or containers to the goods, which it is desired to cool, these goods can also be placed in the cooling container themselves or in the separate sections 3 of the same, with or without the packing or wrappings in which they are transported. In this case also the stream of cooling liquid passing between or among the goods will thoroughly cool the goods with great rapidity.

The collecting pocket or chamber —15— with the sieve —16— may be placed at the entrance to the cooling container —1—, or also between the dividing walls of the same. The sieve —16— will collect particles of herring, dirt, mud and scum, which by the aid of the sieve can be lifted out of the water and then removed by suction or blowing, most suitably by means of a centrifugal fan —20— with a suction pipe —21—. The impurities thus removed traverse a pipe —22— to the drain or to a vessel arranged for that purpose. In this manner it is possible to keep the circulating liquid always clean.

In order to prevent the formation of scum, the irrigation pipes —13— are not carried direct downward from the lowest portion of the pipe —12—, but they proceed from the top part of the pipe in a siphon-like bend. In this way the liquid is made to fill the pipes —13— entirely. Moreover only the cleanest cooling mixture will find an exit through the upward bending curves, while heavier particles such as particles of salt, mud and dirt that may accompany the liquid, will follow the base of the pipe —12— and may be emptied out stop-cock —23— in the lower end of the same.

—24— is a pipe from a water-conduit, —25— a stop-cock on a discharge hose —26— with a movable pipe —27—. Further —28— is a circulating pipe furnished with a stop-cock —29—, from the back of the sieve past the container —1— to the pump —10—, and finally —30— is a drainage pipe for the container —1—.

Having now described my invention, what I claim as new and desire to secure by Letters Patent is:

1. In cooling liquids by passing the same through a container in which it is subjected to a cooling influence in passing repeated times in alternating directions within the container, an arrangement in cooling or freezing plants which operate with a circulating cooling liquid, comprising a container provided with partitions arranged in such a manner that the liquid to be cooled is caused to pass in an alternating continuous stream through compartments formed between the partitions, in contact with cooling pipes and a freezing medium, said freezing medium being placed within the compartments whereby to cause the liquid during its course through the cooling container to rapidly acquire a low temperature.

2. In an apparatus for cooling and freezing fish and other food substances, a container divided into a number of parallel compartments extending vertically, said compartments having alternate communication at the bottom of the container and successively decreasing from a top level, in height toward the discharge end thereof, whereby the stream is caused to take an alternating zig-zag path, cooling means within the compartment for rapidly reducing the temperature of the cooling liquid during the course through the container, means for supplying the liquid to the container and means for discharging the same.

3. In an apparatus for cooling and freezing fish and other food substances, a container divided into a number of parallel compartments extending vertically, said compartments having alternate communication at the bottom of the container and successively decreasing from a top level, in height toward the discharge end thereof, whereby the stream is caused to take an alternating zig-zag path, cooling means within the compartment for rapidly reducing the temperature of the cooling liquid during the course through the container, a discharge for the container, means for drawing and elevating the liquid discharged from the container to a point above the same, an irrigating apparatus consisting of a plurality of pipes horizontally disposed and placed over the goods to be treated, pipes extending upwardly from the top portions of said irrigating pipe and downwardly beneath the same, said pipes having discharge portions leading from the bottom portions thereof and the upwardly extending pipes being in the form of siphon-like bends whereby the formation and escape of scum and foreign matter or impurities to the goods irrigated, is prevented.

4. In an apparatus for cooling food and other substances, a container, spaced partitions arranged within the container and having alternate communication near the bottom and at spaced points above the bottom extending from the top to the bottom of the container from the inlet to the discharge end thereof, a pan having a pocket adjacent to the inlet end of the first-named container, means for draining the pocket, a discharge for the container leading from the bottom thereof, irrigating pipes disposed over the pan for discharging on to the goods to be treated, discharge means leading from the pocket of the pan to the discharge of the container and having valve connections interposed with respect thereto, a pump for discharging the liquid from the container to the irrigating pipes above the pan whereby the same will return to the container from the pan and through the inlet, a rotating sieve adjacent to the inlet and through which the liquid must pass before discharging into the container and means for removing waste particles and impurities from the sieve during the rotation thereof.

In testimony whereof I have signed my name to this specification in the presence of two subscribing witnesses.

NEKOLAI DAHL.

Witnesses:
  TRYGUE OLSON,
  AASE SORENSEN.